United States Patent
Burford

(10) Patent No.: US 12,063,997 B2
(45) Date of Patent: Aug. 20, 2024

(54) SHARK RESISTANT COMPOSITE FABRIC

(71) Applicant: SHARK STOP AUSTRALIA PTY LTD, Ipswich (AU)

(72) Inventor: Haydon Burford, Lennox Head (AU)

(73) Assignee: SHARK STOP AUSTRALIA PTY LTD, Ipswich (AU)

( * ) Notice: Subject to any disclaimer, the term of this patent is extended or adjusted under 35 U.S.C. 154(b) by 92 days.

(21) Appl. No.: 17/602,754

(22) PCT Filed: Apr. 9, 2020

(86) PCT No.: PCT/AU2020/050351
§ 371 (c)(1),
(2) Date: Oct. 9, 2021

(87) PCT Pub. No.: WO2020/206496
PCT Pub. Date: Oct. 15, 2020

(65) Prior Publication Data
US 2022/0160064 A1    May 26, 2022

(30) Foreign Application Priority Data
Apr. 10, 2019  (AU) ................... 2019901237

(51) Int. Cl.
*A41D 31/24* (2019.01)
*A41D 7/00* (2006.01)
*A41D 13/012* (2006.01)
*A41D 31/02* (2019.01)
*B32B 5/02* (2006.01)
*B32B 5/10* (2006.01)
*B32B 25/10* (2006.01)

(52) U.S. Cl.
CPC ............ *A41D 31/245* (2019.02); *B32B 5/024* (2013.01); *B32B 5/026* (2013.01); *B32B 5/10* (2013.01); *B32B 25/10* (2013.01); *A41D 2500/10* (2013.01); *A41D 2500/20* (2013.01); *B32B 2262/0253* (2013.01); *B32B 2307/558* (2013.01); *B32B 2437/00* (2013.01)

(58) Field of Classification Search
CPC ...... A41D 31/245; A41D 13/012; A41D 7/00; A41D 31/02; A41D 31/24; B32B 25/10; B32B 2319/00; B32B 2323/04
See application file for complete search history.

(56) References Cited

U.S. PATENT DOCUMENTS

2010/0287689 A1*  11/2010  Sullivan ............... A62B 17/00
                                                                    156/60
2013/0219579 A1*  8/2013  Molyneux ........... A41D 13/012
                                                                    2/2.15

* cited by examiner

*Primary Examiner* — Joanna Pleszczynska
(74) *Attorney, Agent, or Firm* — Wasserbauer Law, LLC; Damian G. Wasserbauer, Esq.; Nicholas E. Blanton, Esq.

(57) ABSTRACT

The present invention discloses a shark resistant composite fabric that has an outer layer of a woven or knitted shark bite resistant fabric material; an intermediate layer neoprene. An inner layer of a woven or knitted shark bite resistant fabric material may also be provided.

6 Claims, 3 Drawing Sheets

SHARK RESISTANT COMPOSITE FABRIC

TECHNICAL FIELD

The present invention relates to fabrics for use in wetsuits and similar applications, and to garments and other objects formed using such fabrics.

BACKGROUND OF THE INVENTION

Divers, surfers and other water users are subject to the risk of attack by a shark. Most attacks are by a small subset of shark species, primarily bull, tiger and great white sharks. A variety of strategies, electronic shark shielding devices, chemical deterrents and other proposals have been made to reduce the risk of shark attack. These have had varied but generally limited effectiveness.

It has also been proposed to alter a wetsuit, so as to make the wearer less likely to be perceived as food by the shark, including camouflage patterns, stripes and other patterns.

Other approaches to wetsuit design have affixed rigid plates to parts of the wetsuit, in an attempt to prevent bite injuries. For example, U.S. Pat. No. 4,356,569 by Sullivan discloses a shark deterring suit with a base garment which is either chain mail or rubber foam wetsuit material with imbedded multiplicity of hard shield elements. U.S. Pat. No. 3,284,806 by Prasser discloses a protective body garment that has a foam rubber with a metallic reinforcement and metallic mesh for reinforcement with the mesh.

U.S. Pat. No. 4,833,729 by Fox discloses a shark protector suit that has a plurality of spikes to prevent a shark from clamping its jaws over the wearer.

However, these wetsuit designs have not been purchased or not worn because they are heavy, expensive to manufacture, and imposed difficulty for the wearer's movements.

US Patent Application No 20130091610A by Hennessey discloses a wetsuit having an inner layer of neoprene, an ultra-high molecular weight polyethylene woven material, a bittering agent (denatonium benzoate) layer and another outer layer of neoprene.

US Patent Publication No. 2008/0289087 A1 by Sundnes discloses a garment for use with wetsuits that has a layer of elastic material and at least one layer of protective element(s).

It is an object of the present invention to provide an improved shark resistant material for use in wetsuits and similar applications.

SUMMARY OF THE INVENTION

In a first broad form, the present invention provides a composite material with an outer layer of a woven or knitted ultra high molecular weight polyethylene (UHMwPE) material, an intermediate layer of neoprene, and an inner layer of woven or knitted UHMwPE.

According to one aspect, the present invention provides a shark resistant composite fabric including an outer layer of a woven or knitted shark bite resistant fabric, material, an intermediate layer of neoprene and an inner layer comprising a shark bite resistant material.

According to another aspect, the present invention provides a shark resistant composite fabric with an outer layer of a woven or knitted shark bite resistant fabric material and an inner layer of neoprene According to another aspect, the present invention provides a shark resistant composite fabric for use in a garment so that during a shark attack, a contact of the shark's tooth with an outer layer of woven or knitted UHMwPE material resists or deters the completion of a test bite.

Implementations of the present invention allow for a wetsuit which has two distinct modes for resisting shark attack. First, in a test or exploratory bite mode, sharks find the texture and feel of the outer layer unsatisfactory, and in some cases cease their attack at that stage. Second, even if an attack successfully penetrates the outer layer, it has been observed that the penetration of the inner layer is unlikely, particularly as it is spaced apart from the outer layer by the neoprene intermediate layer.

BRIEF DESCRIPTION OF THE DRAWINGS

Illustrative embodiments of the present invention will now be described with reference to the accompanying figures, in which.

DETAILED DESCRIPTION OF THE INVENTION

The present invention will be described with reference to specific implementations. However, it will be understood that it is contemplated that alternative implementations may employ additional features. For example, additional layers of material may be employed in specific locations; an inner lining or neoprene or other material may be added; and the thickness of the neoprene may be varied corresponding to water temperature or other conditions in the body of water where the suit is to be used. It could also be used in conjunction with a camouflaged or otherwise patterned outer surface.

It will be understood further that while specific details such as materials, and dimensions are provided, these are intended as illustrative and not limitative of the possible ways in which the present invention could be implemented.

The present implementation contemplates a generally conventional wetsuit in form, with full length legs and arms. However, the fabric can clearly be incorporated into other garments or wetsuit shapes and styles as required, including boots and hoods.

Figure 1:
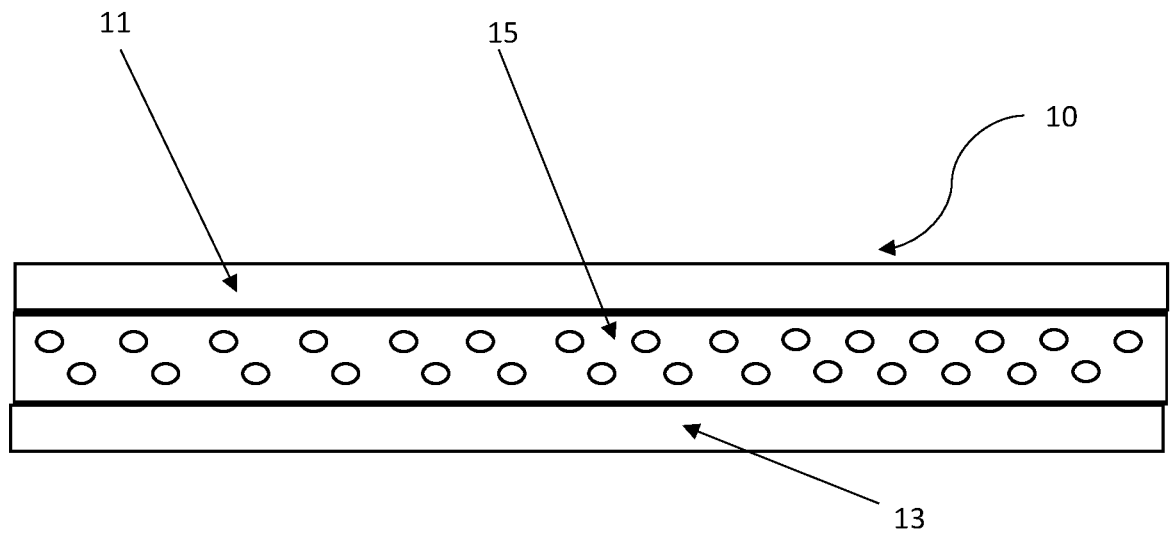
FIG. 1 is a cross-sectional view of one implementation of a fabric according to the present invention.

FIG. 1 shows a cross-sectional view of a fabric 10 according to a first implementation of the present invention. The fabric 10 has an outer layer of a woven or knitted ultra high molecular weight polyethylene (UHMwPE) material 11, an intermediate layer of neoprene 15, and an inner layer of woven or knitted UHMwPE material 13. The layer of neoprene 15 is located between the outer layer of woven or knitted UHMwPE material 11 and the inner layer of woven or knitted UHMwPE material 13. The outer and inner layers of woven or knitted UHMwPE material 11,13 in this implementation have a thickness of 1.2 mm. The intermediate layer of neoprene 15 has a thickness, in the range of about 1 to about 7 mm, for example. A typical value is 3 to 5 mm. The intermediate layer of neoprene 15 is attached to the outer and inner layers of woven or knitted UHMwPE material 11,13 by gluing, heat fusing, or any suitable process. A suitable approach is the use of adhesives typically used in the construction of wetsuits.

Figure 2:
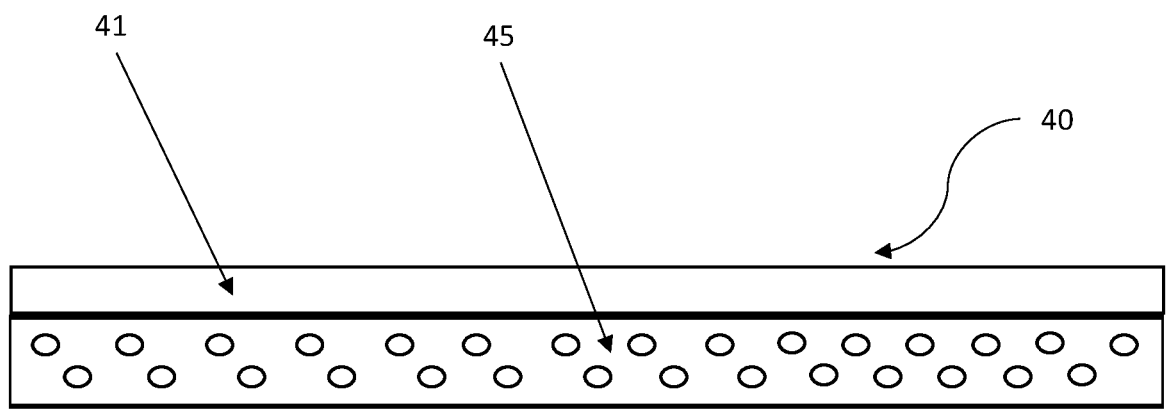
FIG. 2 is a cross-sectional view of another implementation of a fabric according to the present invention.

In another implementation as shown in FIG. 2, a fabric 40 has an outer layer of a woven or knitted ultra high molecular weight polyethylene (UHMwPE) material 41, and an inner layer of neoprene 45.

In another implementation, the outer and inner layers 11,13 of the fabric 10 and the outer layer 41 of the fabric 40 comprise a woven or knitted layer of UHMwPE material, fiberglass and polyester. Preferably, the woven or knitted outer and inner layers 11,13 of the fabric 10 and the outer layer 41 of the fabric 40 have a composition of 42% UHMwPE material, 31% polyester and 27% fiberglass. The properties of this composition of woven or knitted outer and inner layers 11, 13 of the fabric 10 and the outer layer 41 of the fabric 40 are shown in the table below.

|  |  |  | Material Composition UHMWPE 42% Polyester 31% Fiberglass 27% Specification |  |  |
|---|---|---|---|---|---|
|  | Structure knit |  | Construction | Packing Method Roll |  |
|  | Item | Unit | Standard | Tolerance | Test method |
| Properties | Weight | g/m² | 510 | ±35 | ASTM D3776 |
|  | Width | in | 62 | Min. | ASTM D3774 |
|  | Thickness | mm | 1.2 | ±0.2 | ASTM D1777 |
|  | Tensile Strength | kg/in | L:100 W:35 | Min. | ASTM D5035 |
|  | Tearing Strength | kg | L:18 W:22 | Min. | ASTM D2261 |
|  | Elongation Rate | % | L:40 W:200 | Min. | ASTM D5035 |
|  | Abrasion Resistance | Cycle | 600 | Min. | EN388 6.1 |
|  | Abrasion Resistance | Cycle | 600 | Min. | ASTM D3884 |
|  | Cut Resistance | Level | 5 | Min. | EN388 6.2 |
|  | Cut Resistance | ANSI Rating | A6 | Min. | ASTM F2992 |
|  | Puncture Resistance | Level | 4 | Min. | EN388 6.4 |

The UHMwPE material is selected from any suitable commercial material, for example Dyneema® and Spectra®. Dyneema is commercially available from DSM, UHMwPE. (https://www.dsm.com/products/dyneema/en_GB/techndogies/dyneema-form-factors.html).

Spectra is commercially available from Honeywell and an UHMwPE fiber that is claimed to be stronger and lighter than other ingredient fibers. It is created using a gel-spinning process, which forms long oriented molecular chains as the fiber is drawn. (http://www.spectra-fiber.com/science-behind-spectra-fiber/).

Figure 3:
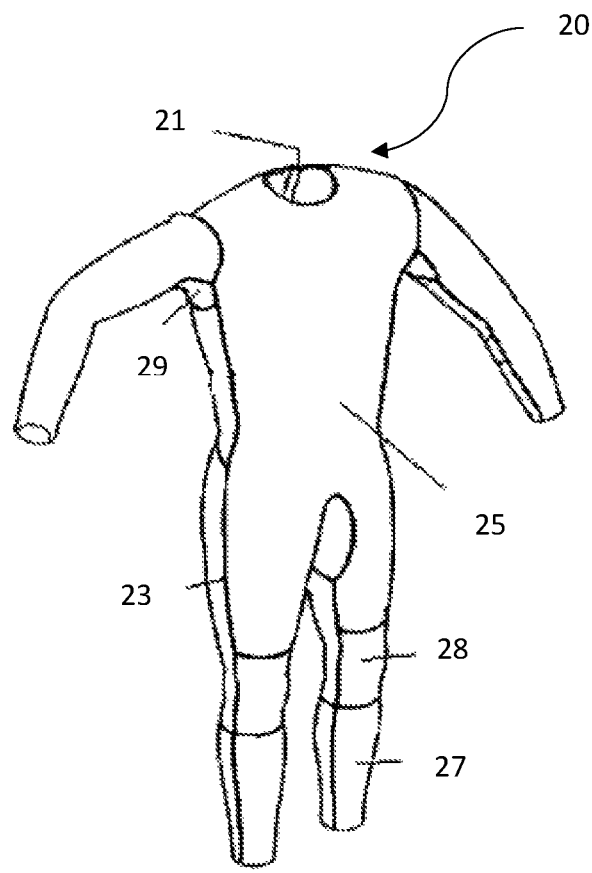
FIG. 3 is a perspective view of a wetsuit made from the fabric of FIG. 1 or FIG. 2.

FIG. 3 shows a wetsuit 20 made from the fabric 10,40. The wetsuit 20 has a closable opening 21, expansive connections at the panel seams 23, and different sized fabric 10,40. The thickness of the fabric 10,40 depends on its area in the wetsuit 20 and can be varied by adjusting the thickness of the layer of neoprene 15. For example, the thickness of the fabric 10,40 could be greater in torso and back areas 25 than in arm and leg areas 27. For high mobility areas like elbows and knees 28, the thickness of fabric 10,40 could be lesser as compared to the other areas. For areas like arm pits 29 and groin, the intermediate layer of neoprene 15 may not be present.

While it is preferred that a wetsuit or similar garment is formed wholly from fabric according to the present invention, it is also contemplated that a wetsuit may have panels or sections of fabric according to the present invention, and sections which are of other construction, for example simple neoprene. Other garments, for example boots, hoods, vests, etc may be constructed from the fabric. The fabric may also be used for other applications other than garments where shark resistance is desired.

It will be appreciated that the thicknesses of layers discussed are the presently preferred form, however, many different thicknesses could be used, subject to effectiveness and practicality. For example, the outer and inner layers may be of different thicknesses, and the intermediate layer may be varied in thickness for different conditions or usages. The present invention may be applied to a wetsuit fabric of any suitable thickness, or to applications such as drysuits in which the neoprene is formed from crushed neoprene material and an additional fleece or other layer is provided inside the suit.

Sharks are curious when they encounter something unusual, such as a diver or swimmer. Their way to explore an object, or potential prey, is to bite it; these bites are known as test bites. Generally, shark bites on humans are exploratory, and the animal will swim away after one bite. Many exploratory bites on surfers may be caused by the shark mistaking the surfer and surfboard for a seal or other prey. These bites are generally not at full bite force, but if delivered by a large shark, significant injury is likely.

Figure 4A:
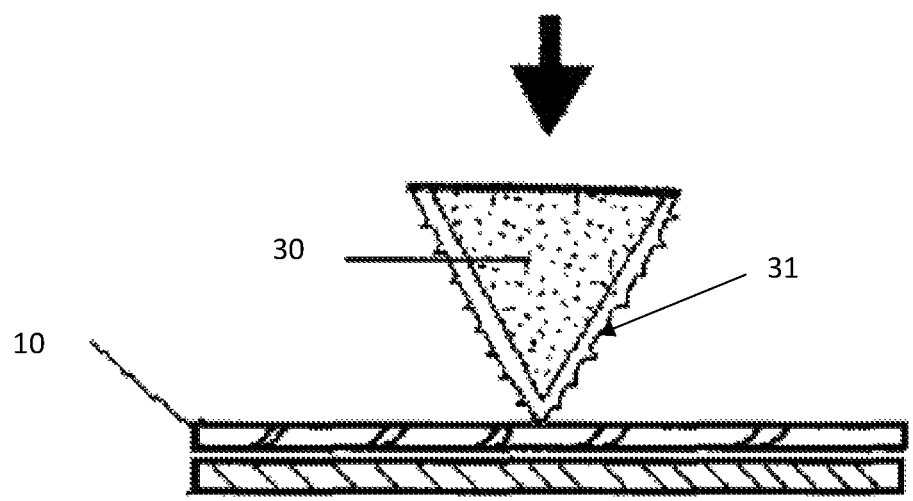
FIG. 4a shows a single shark tooth in initial contact with the fabric of FIG. 1.
Figure 4B:
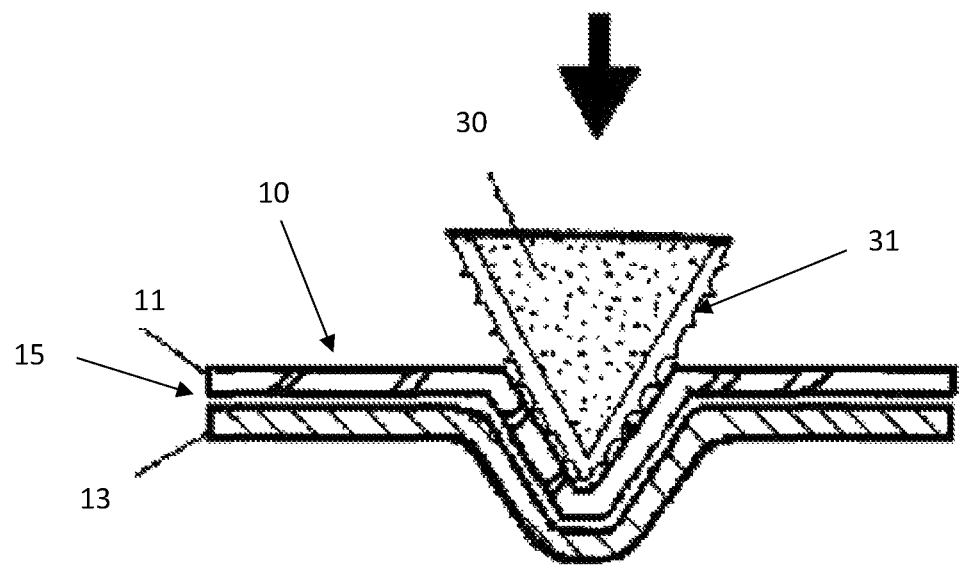
FIG. 4b shows a single shark tooth depressed into the fabric of FIG. 1.

Large predatory sharks generally have multiple rows of triangular shaped teeth, with serrated surfaces. FIG. 4a shows a single shark tooth 30 with serrations 31 in initial contact with the fabric 10. FIG. 4b shows the single shark tooth 30 being depressed into fabric 10, and contacting the outer layer of woven or knitted UHMwPE material 11,. It has been observed in trials of implementations of the present invention that the shark in some cases does not complete a test bite after contact with the woven or knitted outer UHMwPE layer 11. It is postulated that the teeth engage with the fabric in a way that the shark finds unfamiliar, inconsistent with prey, or in some other way terminates the test bite behaviour. This may be because the serrations on the teeth catch or engage with the outer fabric.

In some trials, it has been observed that some sharks will make a more determined, full strength bite, particularly if blood and other attractive scents are in the water. In trials, the teeth of the shark 30 in some cases penetrated the outer layer 11 and the neoprene 15, but did not penetrate the inner UHMwPE layer 13. Whilst it cannot be said that it is not possible for a shark to penetrate the full thickness of the material used in this example, it certainly appears to greatly reduce the risk of such penetration. It will be appreciated that while there may still be injury from a non-penetrating bite, it is much less likely that there will be blood in the water to excite the attacking shark or other sharks, and much less likely that the victim will experience the catastrophic blood loss which is often the cause of death from a shark bite.

While UHMwPE material is presently preferred, it is contemplated that the present invention could be implemented using alternative fibres, or in a mixed fibre fabric, for example with fibreglass, polyester, or other known or yet to be developed materials. The fabric must provide the desired levels of bite resistance, however, other factors such as wearability, having sufficient flexibility and comfort to allow for practical use by divers and surfers, are also important for a practical implementation.

The term neoprene is used in the general sense to mean any kind of synthetic rubber material which is suitable for the present application. It will generally have a degree of buoyancy relative to water. It will typically be a closed cell foam, but may be formed from crushed neoprene or other materials. The precise composition of the neoprene layer is not critical to the inventive concept.

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

All patent and other references cited above are hereby incorporated by reference into the specification.

What is claimed is:

1. A shark resistant composite fabric adapted for use in a garment, the fabric comprising:
   an outer layer of shark bite resistant material;
   an intermediate layer of neoprene; and
   an inner layer of a shark bite resistant material;
   wherein the shark bite resistant material is formed from a woven or knitted layer comprised of UHMwPE and fiberglass material, UHMwPE and polyester material, or UHMwPE, fiberglass, and polyester material;
   wherein in the event of a shark attack, when a contact of the shark's tooth with the outer layer occurs, the outer layer resists or deters the completion of a test bite;
   and wherein said shark bite resistant material comprises a composition of about 42% UHMwPE, about 31% polyester, and about 27% fiberglass.

2. The shark resistant composite fabric according to claim 1, wherein each of the outer and inner layers has a thickness of about 1.2 mm.

3. The shark resistant composite fabric according to claim 1, wherein the intermediate layer has a thickness in the range of about 1 to about 7 mm.

4. A shark resistant garment, the garment being formed using a fabric comprising:
   an outer layer of shark bite resistant material;
   an intermediate layer of neoprene; and
   an inner layer of a shark bite resistant material;
   wherein the shark bite resistant material is formed from a woven or knitted layer comprised of UHMwPE and fiberglass material, UHMwPE and polyester material, or UHMwPE, fiberglass and polyester material;
   wherein in the event of a shark attack, when a contact of the shark's tooth with the outer layer occurs, the outer layer resists or deters the completion of a test bite;
   and wherein said shark bite resistant material comprises a composition of about 42% UHMwPE, about 31% polyester, and about 27% fiberglass.

5. The shark resistant garment according to claim 4, wherein each of the outer and inner layers has a thickness of about 1.2 mm.

6. The shark resistant garment according to claim 4, wherein the intermediate layer has a thickness in the range of about 1 to about 7 mm.

\* \* \* \* \*